F. O. HOAGLAND.
PLUG OR THREAD GAGE.
APPLICATION FILED NOV. 9, 1918.
1,350,311.  Patented Aug. 24, 1920.
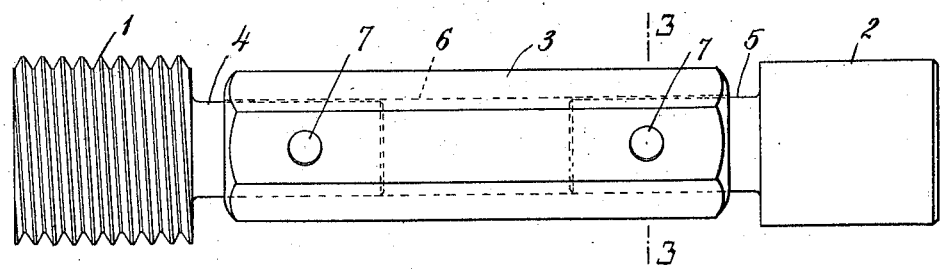
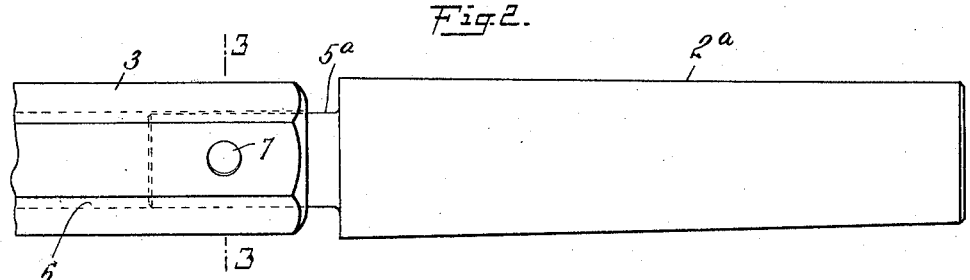
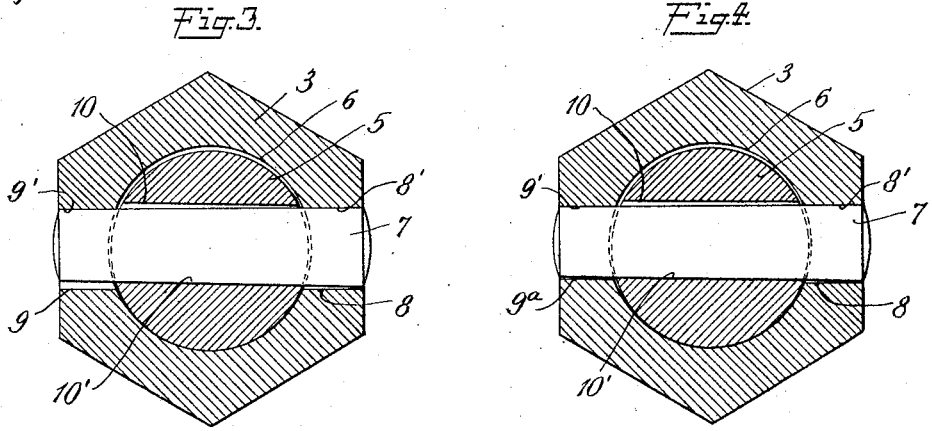
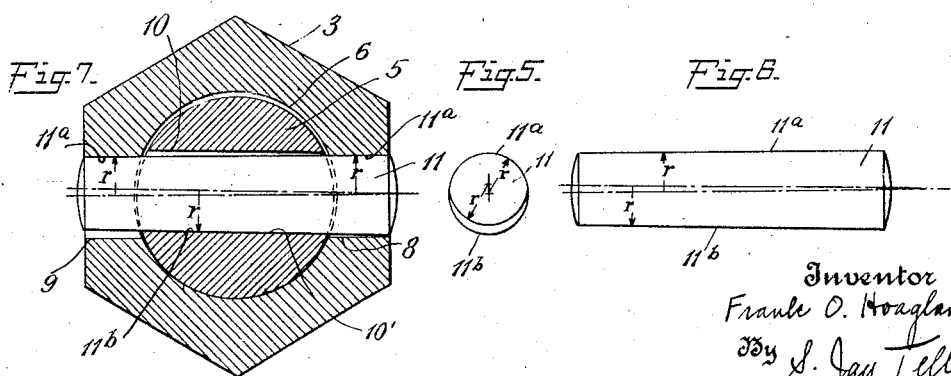
Inventor
Frank O. Hoagland
By S. Jay Teller
Attorney United States Patent Office.

FRANK O. HOAGLAND, OF BRIDGEPORT, CONNECTICUT.

PLUG OR THREAD GAGE.

1,350,311.

Specification of Letters Patent.  Patented Aug. 24, 1920.

Application filed November 9, 1918.  Serial No. 261,779.

*To all whom it may concern:*

Be it known that I, FRANK O. HOAGLAND, a citizen of the United States, residing at Bridgeport, in the county of Fairfield and State of Connecticut, have invented certain new and useful Improvements in Plug or Thread Gages, of which the following is a specification.

The invention relates particularly to plug or thread gages having the gage members formed separately from the handles, each gage member having a cylindrical shank which fits a cylindrical aperture in the handle. The object of the invention is to provide improved means for locking the shank in place in the handle aperture.

In the accompanying drawing, which shows several embodiments of the invention,

Figure 1 is a side view of a combined plug and thread gage.

Fig. 2 is a side view of a taper plug gage.

Fig. 3 is a transverse sectional view, on an enlarged scale, taken along the line 3—3 of Fig. 1 or the line 3—3 of Fig. 2.

Fig. 4 is a view similar to Fig. 3 but showing a slightly different embodiment of the invention.

Figs. 5 and 6 are end and side views respectively of a different form of taper pin.

Fig. 7 is a view similar to Figs. 3 and 4 but showing the construction adapted for the taper pin shown in Figs. 4 and 5.

Referring to the drawing, 1 and 2 are gage members, the member 1 being provided with gaging surfaces thereon adapted for gaging screw threads, and the member 2 being provided with a single gaging surface thereon adapted for gaging a cylindrical hole. The two members 1 and 2 are secured to a handle 3, these members being provided respectively with cylindrical shanks 4 and 5 and the handle 3 being provided with a central cylindrical aperture 6 adapted to receive the shanks. For holding the shanks in place in the aperture in the handle, there are provided transverse pins 7, 7.

Fig. 2 shows a somewhat similar gage having a gage member 2ª provided with a single gaging surface thereon for gaging a tapered hole. The gage member 2ª is provided with a shank 5ª which fits the cylindrical aperture 6 in the handle 3. The shank 5ª is held in place by a transverse pin 7.

My invention relates particularly to the arrangement of parts whereby the pin serves to lock the shank in place in the handle.

Gages in many respects similar to those herein set forth have been heretofore constructed, but these gages have been open to criticism because of the possibility of looseness between the gage members proper and the handle. It is customary, particularly in the case of a tapered gage such as shown in Fig. 2, to attempt to shake the gage to test the closeness of the fit in the hole being gaged. This necessitates a very positive and rigid connection between the handle and the gage members proper, as any looseness in the connection would permit the handle to be shaken, thus indicating a loose fit of the gage in the hole, whereas, as a matter of fact, the gage might fit the hole perfectly.

Fig. 3 is an enlarged cross sectional view of the pin connection, this view showing the aperture in the handle somewhat larger than the shank 5 of the gage member. This difference is considerably exaggerated in order that the invention may be more clearly understood. It will be obvious that with an ordinary pin connection there would be a possibility of the handle being shaken with respect to the gage member. Such relative shaking, however, is entirely eliminated by my invention.

The pin 7, as shown in Fig. 3, is circular in cross section and tapers uniformly from one end to the other. Two approximately central opposite cylindrical holes 8 and 9 are drilled in the handle, these holes being large enough to permit the pin 7 to be freely inserted. As shown in Fig. 3, these holes are of the same diameter and are in alinement. A hole 10, preferably of the same diameter as the holes 8 and 9, is drilled in the shank 5, and this hole 10, while approximately central, is laterally offset to a slight extent so as to be out of exact register with the handle holes. With the holes 8, 9 and 10 drilled as above set forth, the pin 7 is inserted and driven into place. It will be seen that as the result of the lateral offsetting of the hole 10 the pin 7 will bear at one side against the walls of the handle holes 8 and 9 along the lines 8' and 9', and will bear at the other side against the opposite wall of the shank hole 10 along the line 10'. In this way the shank 5 is forced to one side of the aperture 6 and into firm engagement with one wall thereof, thus entirely preventing any looseness of connection.

Fig. 4 shows a construction which is the same as that shown in Fig. 3 except that the handle hole for receiving the smaller end of the pin 7 is smaller than the handle hole for receiving the larger end of the pin. This smaller hole is indicated by $9^a$, and it will be observed that this hole is so positioned that the upper wall thereof at the line 9' is in exact alinement with the upper wall of the hole 8 at the line 8'. The smaller hole $9^a$, as shown in Fig. 4, is in many cases preferable as it leaves less clearance around the pin, thus improving the appearance and avoiding the collection of dirt.

Figs. 5 and 6 show a tapered pin 11 which is somewhat different from the pin 7. This pin has two opposite converging cylindrical surfaces $11^a$ and $11^b$, each having the same radius $r$. When this pin 11 is to be used, the holes in the handle and in the shank are drilled as shown in Fig. 7, the radius of all of the holes being the same as the radius $r$ of the pin surfaces $11^a$ and $11^b$. When the pin 11 is put in place the action will be similar to that described in connection with Fig. 3. However, the surface $11^a$, instead of having line contact at 8' and 9' with the walls of the holes 8 and 9, will have broad surface contact therewith inasmuch as the radius of the surface $11^a$ is the same as the radius of the holes. Similarly, the surface $11^b$, instead of having line contact at 10' with the wall of the hole 10, will have broad surface contact therewith inasmuch as the radius of the surface $11^b$ is the same as the radius of the hole.

What I claim is:

1. The combination of a gage member provided with a gaging surface thereon and having a cylindrical shank, a handle having a cylindrical aperture for receiving and closely fitting the shank, and a tapered pin of approximately circular cross section for securing the shank in place, the handle having two approximately central opposite transverse cylindrical pin-receiving holes arranged with their walls in alinement at one side and the shank having a transverse cylindrical pin-receiving hole which is approximately central but which is laterally offset on the side of the said alined walls out of exact register with the handle holes, the last said hole being of such diameter that the pin bears at one side against the alined walls of the handle holes and at the other side against the opposite wall of the shank hole.

2. The combination of a gage member provided with a gaging surface thereon and having a cylindrical shank, a handle having a cylindrical aperture for receiving and closely fitting the shank, and a tapered pin of approximately circular cross section for securing the shank in place, the handle having two approximately central opposite transverse cylindrical pin-receiving holes of the same diameter and the shank having a transverse cylindrical pin-receiving hole which is of the same diameter and approximately central but which is laterally offset out of exact register with the handle holes, whereby the pin bears at one side against the walls of the handle holes and at the other side against the wall of the shank hole.

3. The combination of a gage member provided with a gaging surface thereon and having a cylindrical shank, a handle having a cylindrical aperture for receiving and closely fitting the shank, and a pin for securing the shank in place, the pin having two opposite sides converging and cylindrical with each such side conforming to the same radius, the handle having two approximately central opposite transverse cylindrical pin-receiving holes and the shank having a transverse cylindrical pin-receiving hole which is approximately central but which is laterally offset out of exact register with the handle holes, the holes all having the same radius as the sides of the pin whereby the pin has broad surface contact at one side against the walls of the handle holes and has broad surface contact at the other side against the wall of the shank hole.

In testimony whereof, I hereto affix my signature.

FRANK O. HOAGLAND.